United States Patent
Fujita et al.

(10) Patent No.: US 8,613,811 B2
(45) Date of Patent: Dec. 24, 2013

(54) GRAPHENE-COATED MEMBER AND PROCESS FOR PRODUCING SAME

(75) Inventors: Daisuke Fujita, Ibaraki (JP); Keisuke Sagisaka, Ibaraki (JP); Keiko Onishi, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 13/123,053

(22) PCT Filed: Oct. 7, 2009

(86) PCT No.: PCT/JP2009/067516
§ 371 (c)(1),
(2), (4) Date: Jun. 9, 2011

(87) PCT Pub. No.: WO2010/041696
PCT Pub. Date: Apr. 15, 2010

(65) Prior Publication Data
US 2011/0265918 A1    Nov. 3, 2011

(30) Foreign Application Priority Data
Oct. 8, 2008    (JP) ................................ 2008-261875

(51) Int. Cl.
*C21D 1/70* (2006.01)
*C21D 1/72* (2006.01)

(52) U.S. Cl.
USPC .......................................... 148/537; 977/847

(58) Field of Classification Search
USPC .......................................... 148/537; 977/847
See application file for complete search history.

(56) References Cited

U.S. PATENT DOCUMENTS

| 6,982,133 | B2 * | 1/2006 | Chandhok et al. ................. 430/5 |
| 2010/0021708 | A1 * | 1/2010 | Kong et al. .................... 428/220 |

FOREIGN PATENT DOCUMENTS

EP    1840648 A1 * 10/2007

OTHER PUBLICATIONS

Translation of Fujita et al. "Competitive Surface Growth of Carbon Nanowires and Graphite (0001) Terraces on a C-doped Ni(111) Substrate", Journal of Surface Science Society of Japan, 24 (9), 531-537, 2003.*
International Search Report issued Jan. 12, 2010 in International (PCT) Application No. PCT/JP2009/067516.
Q. Yu et al., "Graphene Segregated on Ni Surfaces and Transferred to Insulators", Applied Physics Letters, vol. 93, No. 11, pp. 113103-1-113103-3, Sep. 2008.
D. Fujita et al., "Competitive Surface Growth of Carbon Nanowires and Graphite (0001) Terraces on a C-doped Ni(111) Substrate", Journal of the Surface Science Society of Japan, vol. 24, No. 9, pp. 531-537, Sep. 2003.
K. Onishi et al., "Surface Precipitation of Doped Carbon in a CuNi Alloy", Journal of the Vacuum Society of Japan, vol. 45, No. 7, pp. 595-598, Jul. 2002.

* cited by examiner

*Primary Examiner* — Rebecca Lee
(74) *Attorney, Agent, or Firm* — Wenderoth, Lind & Ponack, L.L.P.

(57) ABSTRACT

The present invention provides a graphene-coated member of a novel structure, and a process for producing such graphene-coated members. A graphene-coated member according to a first invention is a graphene-coated member that has a graphene film on a surface of a metallic base of a desired shape. The base includes carbon in a solid-solution state, and the graphene film is formed from solid-solution carbon precipitated at the base surface.

1 Claim, 3 Drawing Sheets

...

GRAPHENE-COATED MEMBER AND PROCESS FOR PRODUCING SAME

This application is a U.S. national stage of International Application No. PCT/JP2009/067516 filed Oct. 7, 2009.

TECHNICAL FIELD

The present invention relates to a process for producing a graphene-coated member that has a graphene film on a surface of a metallic base of a desired shape.

BACKGROUND ART

One of the notable physical characteristics of graphene is the carrier mobility as high as 200,000 $cm^2/Vs$, in excess of those of metals and carbon nanotubes. Some of the other reported characteristics include:

(1) the ability to greatly suppress the characteristic 1/f noise of nano devices;
(2) negative refractive index; and
(3) the behavior of the electrons on graphene as if they had a zero mass.

There are also reports that graphene has a number of unique characteristics that fall between metals and semiconductors, attracting growing interests in the wide variety of graphene characteristics.

One known technique of forming graphene is the high-temperature vapor-deposition decomposition of gas molecules as described in Non-Patent Document 1.

Specifically, this literature describes a graphene forming method in which benzene gas is deposited on an iridium surface while high temperature is maintained.

However, because this method relies on the vapor deposition reaction of benzene molecules, only the surface of the iridium substrate can be coated. The high-temperature vapor-deposition decomposition of gas molecules also has the following problems.

Because the rate of formation varies depending on the frequency at which the gas molecules collide, the back surface portion unreachable by the gas molecules cannot be coated.

Because the collision frequency of the gas molecules is not uniform even on the substrate surface, formation of a graphene coating of a relatively large area is difficult.

[Non-Patent Document 1]
Applied Surface Science 252 (2005) 1221-1227, *Local electronic edge states of graphene layer deposited on Ir(111) surface studied by TM/CITS*

DISCLOSURE OF INVENTION

Problems that the Invention is to Solve

The present invention has been completed under these circumstances, and an object of the invention is to provide a process for producing a graphene-coated member of a novel structure that gets over the conventional problems.

Means for Solving the Problems

The present invention is a process for producing the graphene-coated member. The process includes:

heating a carbon solid-solution metallic base of a desired shape in a vacuum at 600° C. to 950° C. (here and below, in 50° C. units) to precipitate the carbon at a metallic base surface and form graphene; and rapidly cooling the metallic base to 400° C. or less at a cooling rate of $2\times10^\circ$ C./s to $20\times10^\circ$ C./s to integrate a resulting graphene film into the base, wherein only a desired graphene-uncoated portion is heated to a temperature above the graphene-forming temperature during the graphene formation, so as to make the graphene-uncoated portion free of the graphene film.

Advantage of the Invention

According to the present invention, the graphene film formed on the produced graphene-coated member is formed from solid-solution carbon, and the graphene film is formed in an orderly fashion without being affected by disturbance such as a flow of steam components as might occur in the high-temperature vapor-deposition decomposition. The inventions can therefore provide a member, conventionally unavailable, whose base is coated with a homogeneous graphene film.

The graphene coating can impart new functions to the member, including, for example, oxidation resistance, low-gas absorbability, low-gas releasability, and low secondary electron releasability.

The present invention enables reliable and effective production of such members. The invention also enables creation of not only monolayer graphene but multilayer, for example, bilayer graphene. This is possible with a temperature setting immediately below the temperature that enables the creation of monolayer graphene, and in the vicinity of the bulk solid-solution limit temperature.

The high-temperature-range temperature that forms monolayer graphene, and multilayer, for example, bilayer graphene can be found by high-temperature in situ measurement using surface electron spectroscopy. Monolayer graphene can be created with good reproducibility by a heat treatment that incorporates surface analysis functions.

The monolayer graphene coating can stabilize the surface, and can impart functions, particularly such as oxidation resistance, low-gas adsorbability, low-gas releasability, and low secondary electron releasability to the surface of metals, such as palladium, platinum, iridium, rhodium, nickel, and cobalt, and alloys thereof, forming a solid solution with carbon.

Further, a detached monolayer graphene coating can be restored by performing the heat treatment again.

Further, the monolayer graphene can be extracted by the wet etching of the base metal.

Further, because a region free of the graphene film can be formed anywhere as desired, the various characteristics of the graphene film to be exploited can be controlled by the shape of the graphene film.

BEST MODE FOR CARRYING OUT THE INVENTION

Any metallic base is usable in the present invention as long as it can form a solid solution with carbon, and an alloy of more than one metal element can be used as the metallic base. Specifically, with the use of metal elements (such as nickel, platinum, palladium, rhodium, iridium, and cobalt) that have prominent carbon solubility in a metal element-carbon binary phase diagram, the solid-solution carbon can reversibly precipitate out to the surface and dissolve into the bulk in thermal equilibrium in response to temperature.

Thus, controlling the vacuum heat-treatment temperature enables the surface coverage by graphene and the number of graphene layers to be controlled. Further, the graphene coating layer can be completely removed by maintaining high temperature, as required.

It is known that the surface monolayer graphene phase can stably exist at high temperatures. For example, a graphene coating layer can be fixed by rapid cooling after a solid solution of carbon in nickel or platinum which is subjected to a high-temperature heat treatment to precipitate monolayer graphene at the surface, as will be described in Example below. It can thus be said by analogy that the same advantage also can be obtained by the substitution using cobalt, palladium, rhodium, and iridium having similar equilibrium binary phase diagrams, or using alloys of these metals.

The precipitation heat temperature ranges from 600° C. to 950° C., preferably 700° C. to 900° C., more preferably 750° C. to 850° C.

Above the upper limit temperature 950° C., the surface graphene coating layer disappears, and a clean surface can be formed. In the absence of a graphene coating, reactions such as oxidation and adsorption may occur in an atmospheric environment.

Below the lower limit temperature 600° C., the diffusion rate of the solid-solution carbon is low, and a sufficiently long heat-treatment is needed. Further, depending on carbon concentration, the growth of multilayer graphene dominates over monolayer graphene growth.

The rate of rapid cooling is $2 \times 10°$ C./s to $20 \times 10°$ C./s, preferably $5 \times 10°$ C./s to $20 \times 10°$ C./s, more preferably $10 \times 10°$ C./s to $20 \times 10°$ C./s.

No problem is caused above the upper limit; however, such high rates require the use of an apparatus for rapidly cooling the sample, and restrict the sample thickness.

Below the lower limit, the formation of multilayer graphene coating may dominate.

The temperature after the rapid cooling is preferably from ordinary temperature (generally in a range of from 15° C. to 25° C.) to 400° C.

Above the upper limit, the growth of multilayer graphene may occur.

No problem is caused below the lower limit; however, cooling below room temperature additionally requires a sample cooling apparatus.

It was found that graphene formation does not occur in a specific portion heated and not rapidly cooled during the rapid cooling process.

This heat effect can be utilized to avoid graphene formation in particular areas of the target member, or to form a graphene film only in a specific portion, depending on intended use.

Specifically, a product that does not have graphene formation in a desired portion of the base can be produced by, for example, heating a specific portion of the base in a vacuum chamber using an external laser, or by heating a specific portion of the base with a heater installed at a specific part of a base supporting structure.

The present invention also enables formation of multilayer graphene, for example, such as bilayer graphene, in addition to monolayer graphene.

This is possible with a temperature setting immediately below the temperature that enables the creation of monolayer graphene, and in the vicinity of the bulk solid-solution limit temperature.

The high-temperature-range temperature that forms monolayer graphene, and multilayer, for example, bilayer graphene can be found by high-temperature in situ measurement using surface electron spectroscopy. Monolayer graphene can be created with good reproducibility by a heat treatment that incorporates surface analysis functions.

The monolayer graphene coating can stabilize the surface, and can impart functions, particularly such as oxidation resistance, low-gas adsorbability, low-gas releasability, and low secondary electron releasability to the surface of metals, such as palladium, platinum, iridium, rhodium, nickel, and cobalt, and alloys thereof, forming a solid solution with carbon.

Further, a detached monolayer graphene coating can be restored by performing the heat treatment again.

Example of the present invention is described below.

EXAMPLES

<Example of Forming a Solid-Solution of Carbon in a Base (See FIG. 1)>

(1) The nickel, cobalt, palladium, rhodium, platinum, iridium metals that can form a solid solution with carbon, and alloys containing these elements as the primary components are doped with carbon to a predetermined solid-solution concentration using an apparatus (system) illustrated in FIG. 1.

Specifically, bases of the metals presented in Table 1 below (width, 10 mm; length, 10 mm; thickness, 0.1 mm) were used as metal samples.

The metals and a high-purity graphite powder to be formed into a solid solution are contacted in a solid phase using a vacuum solid-phase diffusion method.

The degree of vacuum is from high vacuum to ultrahigh vacuum. FIG. 1 represents a combination of a turbo-molecular pump and a roughing pump. However, any vacuum evacuation system can be used, provided that it can reach high vacuum to ultrahigh vacuum.

Specifically, the bases presented in Table 1 below were subjected to a vacuum solid-phase diffusion method under the conditions of Table 1.

Aside from the turbo-molecular pump, the main pump may be an oil diffusion pump, an ion pump, or a cryopump.

The roughing pump may be an oil-sealed rotary pump (rotary pump), or a scroll pump.

Equilibrium solid-solution concentration can be determined using the metal-carbon binary phase diagram and the vacuum heat retention temperature.

The retention time is set such that the carbon diffusion distance in the metal at a predetermined heat retention temperature is sufficiently larger than a distance equivalent of a sample thickness.

The contact between the high-purity carbon powder and a metal substrate sample is very important in a vacuum solid-phase diffusion method. Thus, it is recommended to use a high-purity graphite fine powder, and a graphite vessel for the high-purity graphite fine powder. Containers configured from materials that do not involve impurity mixing even at high temperatures (for example, high-melting-point metals such as BN, zirconia, and molybdenum) also can be used.

Carbon may be added to a molten-state metal to produce a carbon alloy of a predetermined concentration (melting method).

(2) After the carbon solid-solution process, the carbon solid-solution concentration in the bulk is identified.

In a vacuum solid-phase diffusion method, the carbon concentration can be obtained by estimating the solid-solution concentration as an equilibrium carbon solid-solution concentration from the heat-treatment temperature. The equilibrium carbon solubility can be found from the binary phase diagram.

Multi-element alloys require the actual measurement of carbon equilibrium solid-solution concentration at each temperature. Various chemical and physical analysis techniques can be used for the measurement of carbon concentration.

In this Example, the solid-solution carbon concentration was calculated as an equilibrium concentration derived from the binary phase diagram. The results are presented in Table 1.

TABLE 1

| | | Vacuum solid-phase diffusion method | | | | | |
|---|---|---|---|---|---|---|---|
| Experiment No. | Base composition | Vacuum degree | Maintained temperature Temperature | Time | Carbon source | Vessel material | Carbon solid-solution concentration |
| 1 | 99.9% Ni | $10^{-8}$ Torr | 815° C. | 90 h | 99.999% carbon powder | Graphite | 0.5 atm % |
| 2 | 99.99% Pt | $10^{-8}$ Torr | 800° C. | 90 h | 99.999% carbon powder | Graphite | 1.0 atm % |
| 3 | 99.99% Pd | $10^{-8}$ Torr | 800° C. | 90 h | 99.999% carbon powder | Graphite | 4.0 atm % |

<Formation of Graphene Coating Film>

The formed carbon solid-solution base was used to form a graphene coating film (see FIG. 2).

The figure represents a flowchart of synthesizing a graphene coating layer on a carbon solid-solution metal substrate surface.

First, a metal substrate molded into a shape of a thin sheet (the base containing the carbon in a solid-solution state, obtained as above) was surface-smoothed, washed, and optionally further molded. In this Example, the surface was smoothed by mechanical polishing, and mirror-finished by buffing using a 0.05 micron-diameter alumina particle suspension. Ultrasonic washing using ethanol and acetone was performed for washing.

By the heat treatment I of the carbon solid-solution metal substrate material using an ultrahigh vacuum apparatus after the smoothing and washing surface treatment, a monolayer or bilayer graphene coating can be created by surface precipitation. A sample heater designed to provide a sufficiently uniform sample temperature is used.

The state of the graphene monolayer or bilayer is checked by the in situ measurement of the carbon concentration on a sample surface. The in situ measurement is performed using a surface-sensitive analytical technique such as Auger electron spectrometry, X-ray photoelectric spectrometry.

The sample is rapidly cooled to fix the surface graphene-coated state. (heat treatment II)

Specific conditions are as presented in Table 2.

The sample temperature can be monitored using a thermocouple or infrared thermometer.

The surface smoothing for mirror-finishing can be performed by techniques such as electrolytic polishing, electro chemical buffing, and buffing.

TABLE 2

| | | Base | | Heat treatment I | | | | | Heat treatment II (cooling) |
|---|---|---|---|---|---|---|---|---|---|
| Experiment No. | Table 1 No. | Smoothness | Cleanness | Vacuum degree (Torr) | Heat treatment Temperature (° C.) | Time (min) | Number of graphene layers | Rate ×10° C./s | Post-temperature (° C.) |
| 1 | 1 | Mirror-finish | Clean surface | $10^{-10}$ | 900 | 30 | 1 | 15 | 25 |
| 2 | 2 | Mirror-finish | Clean surface | $10^{-9}$ | 950 | 10 | 0-1 | 10 | 25 |
| 3 | 2 | Mirror-finish | Clean surface | $10^{-9}$ | 1000 | 10 | 0 | 10 | 25 |
| 4 | 2 | Mirror-finish | Clean surface | $10^{-9}$ | 900 | 10 | 1 | 10 | 25 |
| 5 | 2 | Mirror-finish | Clean surface | $10^{-9}$ | 800 | 10 | 1-2 | 10 | 25 |
| 6 | 2 | Mirror-finish | Clean surface | $10^{-8}$ | 750 | 20 | 2 | 10 | 25 |
| 7 | 3 | Mirror-finish | Clean surface | $10^{-9}$ | 750 | 20 | 0-1 | 5 | 25 |
| 8 | 3 | Mirror-finish | Clean surface | $10^{-9}$ | 700 | 120 | 1 | 5 | 25 |

FIG. 3 is a photographic view representing the result of the surface measurement of a sample corresponding to Experiment No. 2 of Table 2 performed as follows.

Carbon was dissolved in a polycrystalline, high-purity platinum thin plate to form a solid solution, and the sample was maintained at high temperature (1,373 K, 10 min) after surface smoothing to sufficiently dissolve the carbon in the bulk. The sample was then maintained at a predetermined temperature (1,223 K), and rapidly cooled (cooling rate of up to 100 K/s) after forming a monolayer graphene coating on the surface. The surface was then measured with a scanning Auger electron microscope.

The SEM image appears raised at the central portion. This is a region uncoated with graphene, as can be seen in the Auger image (carbon: C KLL, platinum: Pt NOO). The whole surface is coated with the monolayer graphene. The whole surface can be coated with the monolayer graphene by setting the temperature uniform.

The graphene uncoated region can be formed by creating local temperature nonuniformity (higher temperature region). A particular region can be maintained at a relatively high temperature by localized irradiation of, for example, an electron beam or a laser beam, and a clean surface is formed in such regions.

FIG. 4 represents an Auger electron spectrum obtained from the surface after the high-temperature rapid cooling of the carbon solid-solution polycrystalline platinum substrate sample corresponding to Experiment No. 2 of Table 2. There is no carbon Auger peak (C KLL) in the clean platinum surface. On the other hand, a carbon Auger peak (C KLL) is observed in the monolayer graphene-coated region, and there is a small low-energy-side platinum peak (Pt NOO), which is lowering.

A bilayer graphene coating can be formed preferentially by controlling the maintained temperature of heat treatment I.

The same result was also obtained for carbon solid-solution nickel samples.

INDUSTRIAL APPLICABILITY

The metallic member coated with monolayer or bilayer graphene according to the present invention has a number of potential applications, as follows.

The graphene layer coating can form an antifouling surface inert to the adsorption or oxidation reaction of gas molecules or contaminating particles. This enables formation of a metallic member having a glossy surface that remains stable for extended time periods.

Because the conductive graphene-coated member with such a stable surface has a low gas-releasing rate, it can be used as an ultrahigh vacuum material of low-gas releasability.

In addition to the low-gas releasability, the release rate of secondary electrons in a vacuum is small, and the work function is constant. These properties enable the graphene-coated member to be used as a structural member for ultraprecision electron spectrometry in an ultrahigh vacuum.

The insulating substrate prepared by transferring the graphene coating detached from the substrate metal can be used as a high-mobility electronic device substrate utilizing the electrical properties of graphene.

A metal thin plate with a graphene coating can be used as a durable electrode for various batteries.

Figure 1:
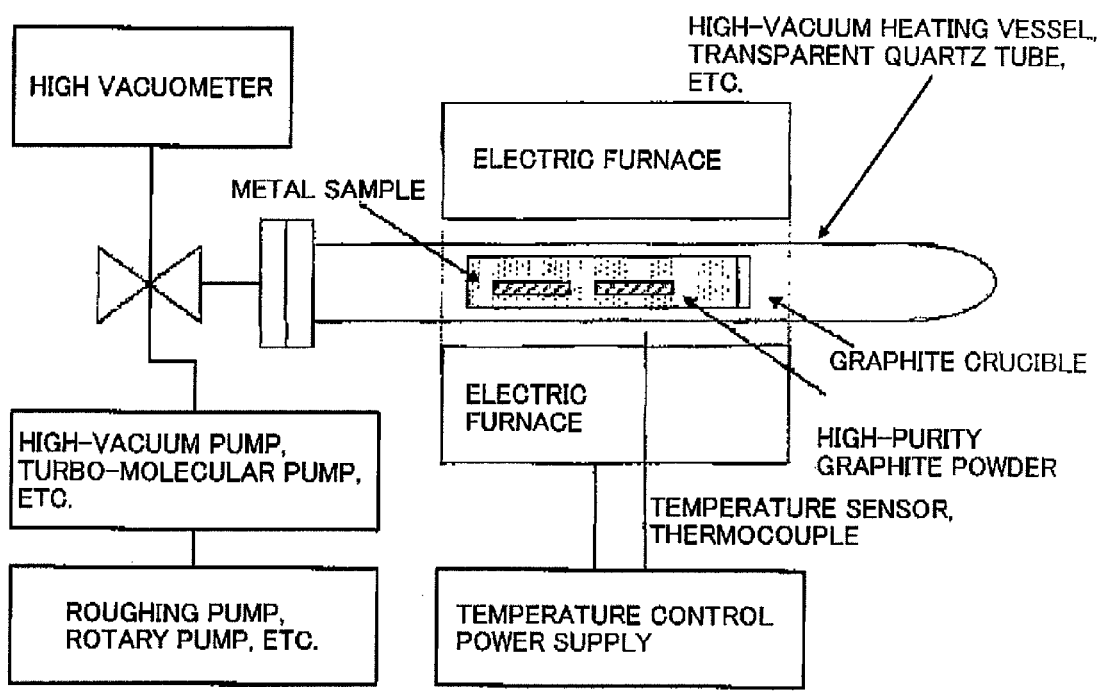
FIG. 1 is a flowchart representing carbon doping by a vacuum solid-phase diffusion method using a graphite fine powder.
Figure 2:
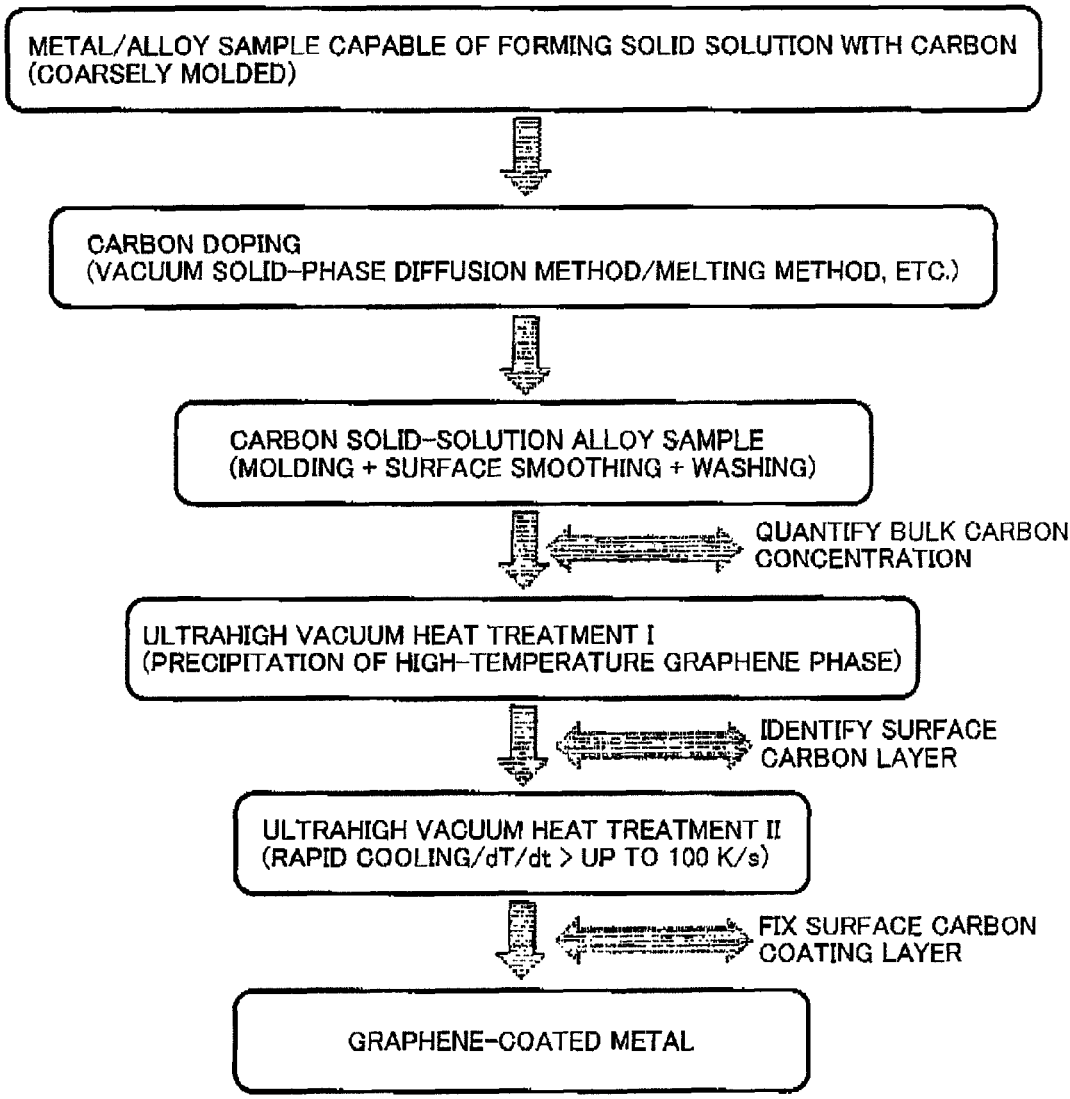
FIG. 2 is a flowchart representing the synthesis of a graphene coating layer on a carbon solid-solution metal substrate surface.
Figure 3:
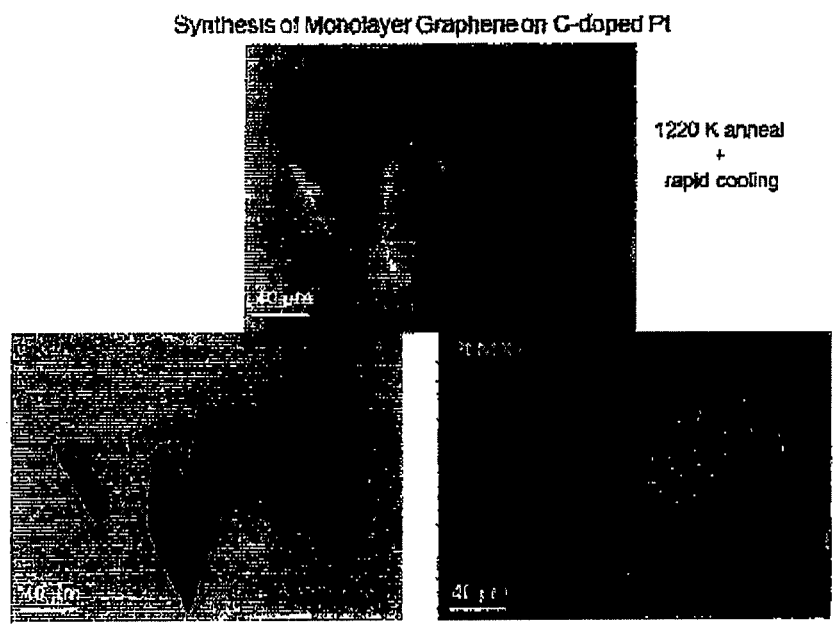
FIG. 3 is a photographic view representing the result of Auger electron microscopy after the high-temperature rapid cooling of carbon solid-solution polycrystalline platinum.
Figure 4:
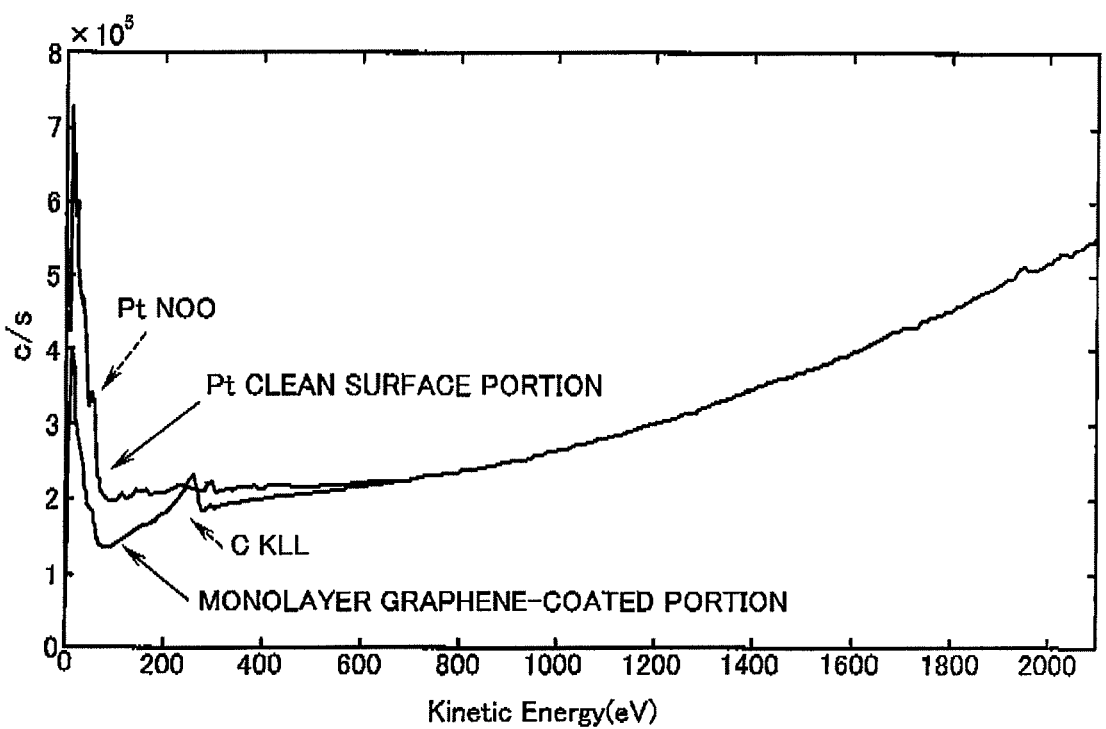
FIG. 4 is a graph representing an Auger electron spectrum after the high-temperature rapid cooling of carbon solid-solution polycrystalline platinum.

The invention claimed is:

1. A process for producing a graphene-coated member, the process comprising:
   heating a carbon solid-solution metallic base of a desired shape in a vacuum at 600° C. to 950° C. to precipitate the carbon at a metallic base surface and form graphene; and
   rapidly cooling the metallic base to 400° C. or less at a cooling rate of 2×10° C./s to 20×10° C./s to integrate a resulting graphene film into the base,
   wherein in the metallic base, the graphene film is prevented from forming in a desired graphene-uncoated portion by heating the desired graphene-uncoated portion above the graphene-forming temperature during graphene formation.

* * * * *